United States Patent
Takeno et al.

(10) Patent No.: US 9,323,390 B2
(45) Date of Patent: Apr. 26, 2016

(54) COORDINATE RECOGNITION APPARATUS AND CONTROL METHOD THEREOF

(75) Inventors: Yuishi Takeno, Shizuoka-ken (JP); Shinji Saegusa, Shizuoka-ken (JP); Takuya Ogishima, Shizuoka-ken (JP); Sadatoshi Oishi, Shizuoka-ken (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 1053 days.

(21) Appl. No.: 13/305,642

(22) Filed: Nov. 28, 2011

(65) Prior Publication Data

US 2012/0136624 A1  May 31, 2012

Related U.S. Application Data

(60) Provisional application No. 61/417,595, filed on Nov. 29, 2010.

(51) Int. Cl.
- *G01C 7/04* (2006.01)
- *G06F 3/01* (2006.01)
- *G06F 3/03* (2006.01)
- *G06F 3/0484* (2013.01)
- *G06F 3/042* (2006.01)
- *G06F 3/041* (2006.01)

(52) U.S. Cl.
CPC .............. *G06F 3/042* (2013.01); *G06F 3/0418* (2013.01)

(58) Field of Classification Search
CPC ....................................................... G06F 3/00
USPC ..................... 702/19, 20, 150, 179, 181, 183; 345/173
See application file for complete search history.

(56) References Cited

U.S. PATENT DOCUMENTS

| | | | |
|---|---|---|---|
| 5,241,139 A | 8/1993 | Gungl et al. | |
| 5,341,155 A * | 8/1994 | Elrod et al. | 345/179 |
| 6,243,076 B1 * | 6/2001 | Hatfield | 345/156 |
| 6,506,889 B1 | 1/2003 | Han et al. | |
| 7,075,524 B2 * | 7/2006 | Kobayashi et al. | 345/173 |
| 8,403,203 B2 * | 3/2013 | Goertz et al. | 228/254 |
| 8,614,672 B2 * | 12/2013 | Ohta et al. | 345/158 |
| 2008/0300055 A1 * | 12/2008 | Lutnick et al. | 463/39 |

FOREIGN PATENT DOCUMENTS

| | | |
|---|---|---|
| JP | 08-123618 | 5/1996 |
| JP | 08-272534 | 10/1996 |
| JP | 3866833 | 1/2007 |
| JP | 3896106 | 3/2007 |

* cited by examiner

*Primary Examiner* — Gregory J Toatley
*Assistant Examiner* — Felix Suarez
(74) *Attorney, Agent, or Firm* — Patterson & Sheridan, LLP

(57) ABSTRACT

According to one embodiment, a coordinate recognition apparatus includes a detection device, a first calculation section, a second calculation section, and a setting section. The detection device detects an operation for an operation area. The first calculation section calculates coordinates of an operation position by a user on the basis of the detection result of the detection device. The second calculation section calculates the smoothed coordinates by smoothing a particular number m (m>0) of samples among the coordinates calculated by the first calculation section counted from the new one in a calculation order. The setting section sets a value of the number m of samples to be smaller as the speed of movement of the operation position is higher.

16 Claims, 7 Drawing Sheets

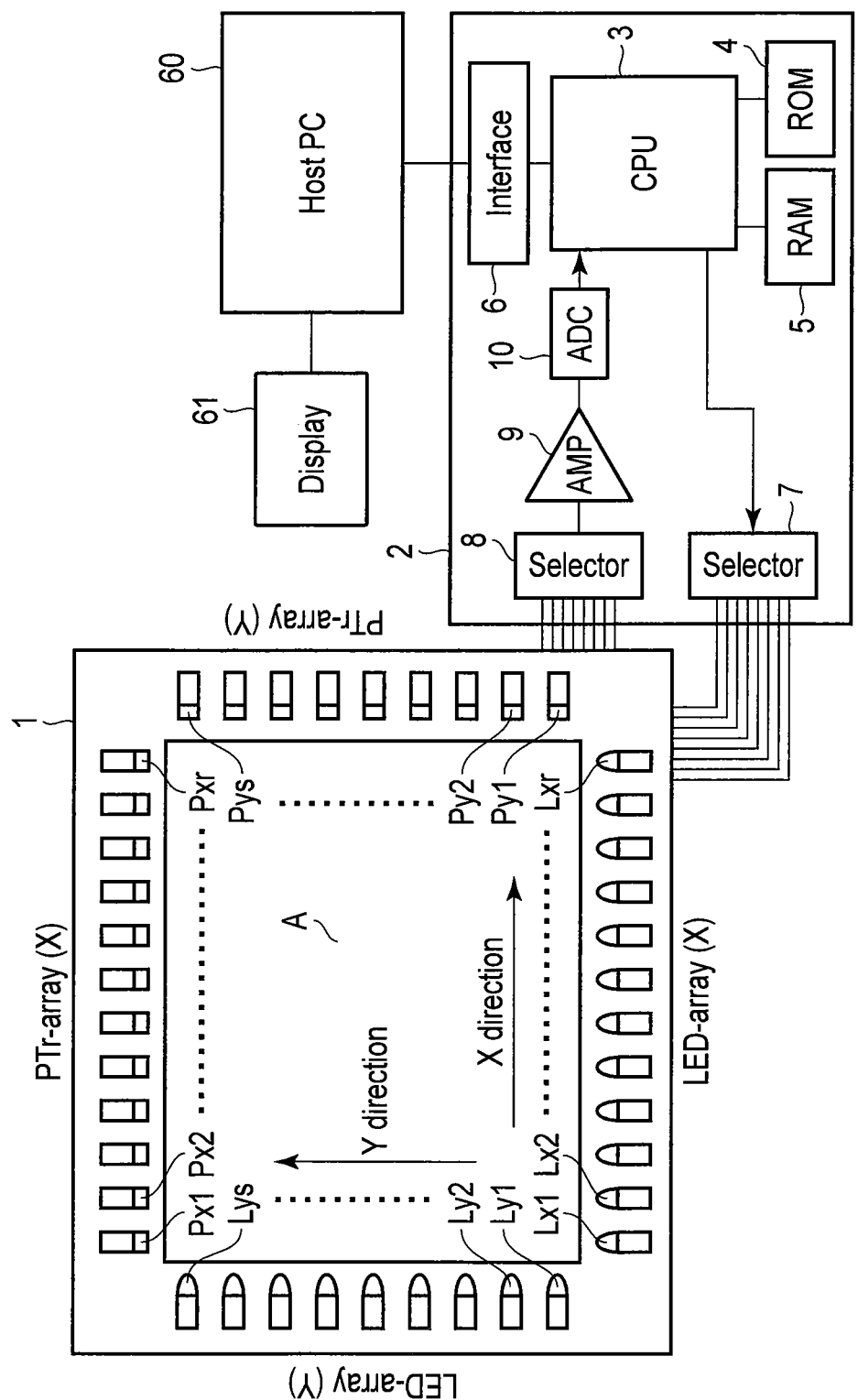
F I G. 1

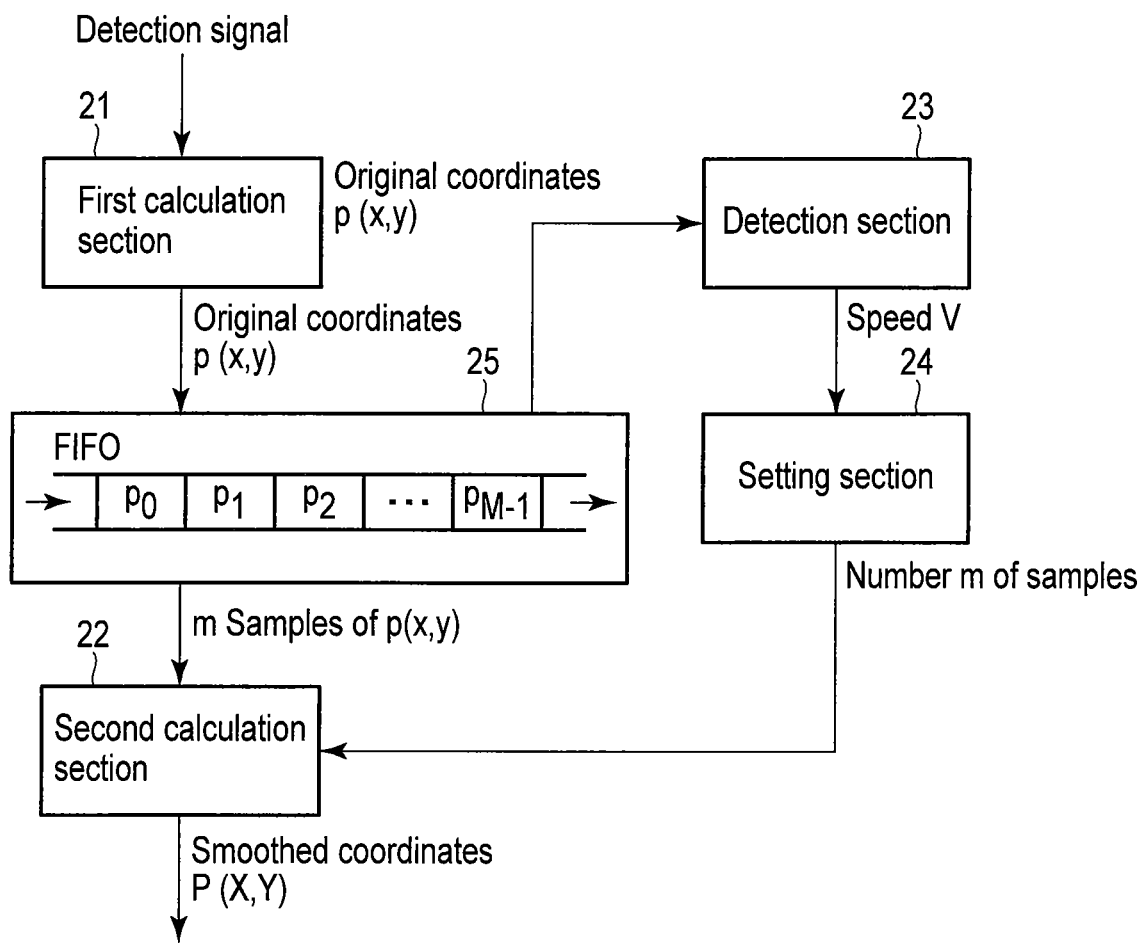
F I G. 4

COORDINATE RECOGNITION APPARATUS AND CONTROL METHOD THEREOF

CROSS-REFERENCE TO RELATED APPLICATIONS

This application is based upon and claims the benefit of priority from U.S. provisional application 61/417,595, filed on Nov. 29, 2010, the entire contents of which are incorporated herein by reference.

FIELD

Embodiments described herein relate generally to a coordinate recognition apparatus that recognizes coordinates of an operation position by a user and a control method thereof.

BACKGROUND

Hitherto, coordinate recognition apparatuses such as a touch panel apparatus that, when a user operates a screen using a finger or a stylus, recognizes coordinates of the operation position to be output to a host computer or the like have been used in various fields.

In such an apparatus, output coordinates may vary due to a problem of the resolution at which the operation position is detected, the effect of noise, and the like. When such variations occur, a curve or the like drawn by the user on the screen is not smoothly input.

In general, since noises contain many high-frequency components compared to a change in the operation position, noise removal can be achieved by smoothing a plurality of points of coordinates recognized by the coordinate recognition apparatus.

However, when a degree of smoothing is strengthened, while the effect of noise is removed and smooth inputting can be achieved, there are problems in that, according to the shape of a trace of the operation positions, the trace of output coordinates is significantly deformed by excessive smoothing, or output coordinates are significantly delayed compared to the actual operation positions and thus followability is degraded.

In these circumstances, there is a need to devise a means capable of, when coordinates of an operation position are recognized by a coordinate position apparatus, reducing variations in the output coordinates caused by noise or the like, and obtaining good followability.

BRIEF DESCRIPTION OF THE DRAWINGS

FIG. 1 is a block diagram showing the hardware configuration of a coordinate recognition apparatus according to an embodiment.

FIG. 4 is a block diagram showing the functions of a controller according to a first embodiment.

DETAILED DESCRIPTION

Figure 2:
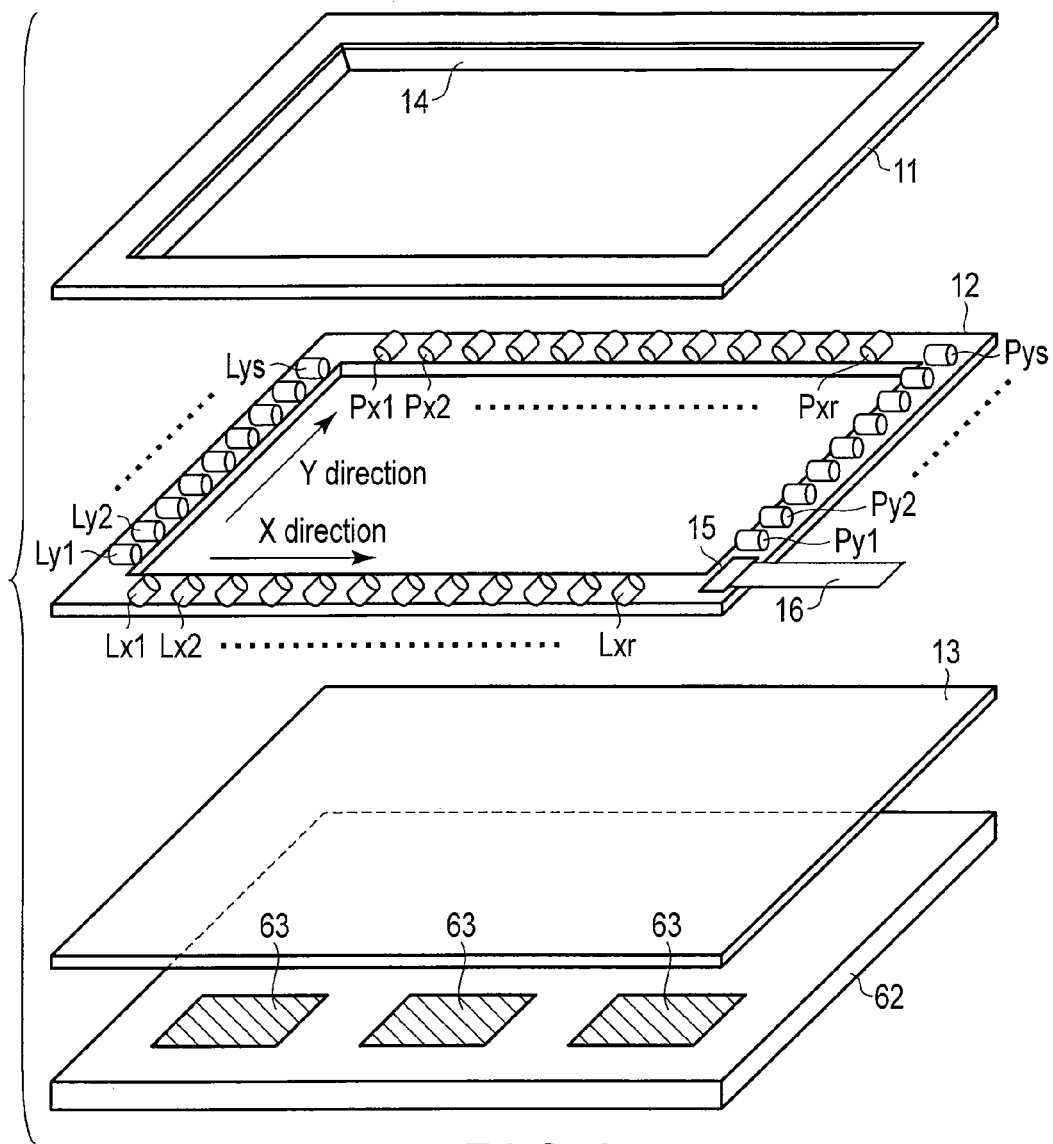
FIG. 2 is an exploded perspective view of an input device and the like included in the coordinate recognition apparatus according to the embodiment.

In general, according to one embodiment, a coordinate recognition apparatus includes a detection device, a first calculation section, a second calculation section, and a setting section.

The detection device detects an operation by a user for an operation area. The first calculation section calculates coordinates of an operation position by the user on the basis of a detection result of the detection device. The second calculation section calculates the smoothed coordinates by smoothing a particular number m (m>0) of samples among the calculated coordinates by the first calculation section counted from the new one in a calculation order. The setting section sets a value of the number m of samples to be smaller as a speed of movement of the operation position of the user for the operation area is higher.

Hereinafter, embodiments will be described with reference to the drawings.

In each embodiment, a coordinate recognition apparatus that optically detects a touched operation on a display is exemplified. Here, the coordinate recognition apparatus may use a contact type touch panel such as a resistive type or a capacitive type.

Hardware Configuration of Coordinate Recognition Apparatus

First, the hardware configuration of the coordinate recognition apparatus which is common to the embodiments will be described.

FIG. 1 is a block diagram showing the hardware configuration of the coordinate recognition apparatus. The coordinate recognition apparatus includes a detection device 1, a controller 2, and the like.

The detection device 1 includes a plurality of light-emitting elements Lx1 to Lxr (r is an integer, r≥2) one-dimensionally arranged, light-sensing elements Px1 to Pxr one-dimensionally arranged in parallel to the array of the light-emitting elements Lx1 to Lxr, light-emitting elements Ly1 to Lys (s is an integer, s≥2) one-dimensionally arranged in a direction perpendicular to the arrangement direction of the light-emitting elements Lx1 to Lxr, and light-sensing elements Py1 to Pys one-dimensionally arranged in parallel to the array of the light-emitting elements Ly1 to Lys.

The light-emitting elements Lx1 to Lxr and Ly1 to Lys are light-emitting diodes (LEDs) that generate infrared rays by being driven by the controller 2. The light-sensing elements Px1 to Pxr and Py1 to Pys are phototransistors (PTr) that sense the infrared rays and output signals corresponding to the intensities of the sensed infrared rays to the controller 2. An area A surrounded by the light-emitting elements Lx1 to Lxr and Ly1 to Lys and the light-sensing elements Px1 to Pxr and Py1 to Pys is an area (operation area) that detects an operation by an object such as a finger of a user or a stylus. In addition, in FIG. 1 or in FIG. 2 described later, an example in which r=12 and s=9 are set is shown.

In each embodiment, a case where the light-emitting elements Lx1 to Lxr and the light-sensing elements Px1 to Pxr are arranged to oppose each other in the X direction, and the light-emitting elements Ly1 to Lys and the light-sensing elements Py1 to Pys are arranged to oppose each other in the Y direction is exemplified. In addition, through pairs of the light-emitting element Lx1 and the light-sensing element Px1, the light-emitting element Lx2 and the light-sensing element Px2, the light-emitting element Lx3 and the light-sensing element Px3, ..., the light-emitting element Lxr and the light-sensing element Pxr, and the light-emitting element Ly1 and the light-sensing element Py1, the light-emitting element Ly2 and the light-sensing element Py2, the light-emitting element Ly3 and the light-sensing element Py3, ..., the light-emitting element Lys and the light-sensing element Pys, r+s light paths are formed.

In the following description, the pairs of the light-emitting element Lx1 and the light-sensing element Px1, the light-emitting element Lx2 and the light-sensing element Px2, the light-emitting element Lx3 and the light-sensing element Px3, ..., the light-emitting element Lxr and the light-sensing element Pxr are denoted by identification numbers $k_x$ (integers, $1 \le k_x \le r$) which increase from 1 to r in this order, and the pairs of the light-emitting element Ly1 and the light-sensing element Py1, the light-emitting element Ly2 and the light-sensing element Py2, the light-emitting element Ly3 and the light-sensing element Py3, ..., the light-emitting element Lys and the light-sensing element Pys are denoted by identification numbers $k_y$ (integers, $1 \le k_y \le s$) which increase from 1 to s in this order.

The controller 2 includes a CPU (Central Processing Unit) 3, a ROM (Read Only Memory) 4, a RAM (Random Access Memory) 5, an interface 6, a selector 7, a selector 8, an amplifier 9, an AD converter 10, and the like.

The ROM 4 stores fixed data such as various default values and computer programs. The RAM 5 functions as a main memory, and forms various work memory areas.

The interface 6 is, for example, an RS-232C device for communication connection between a host computer 60 and the coordinate recognition apparatus. The host computer 60 is, for example, a personnel computer and is connected to a display 61 such as an LCD (Liquid Crystal Display). The detection device 1 is disposed on the front surface of the display 61. The host computer 60 displays various GUI (Graphical User Interface) components that can be operated by the detection device 1 on the display 61.

The CPU 3 executes the computer programs stored in the ROM 4 and executes various processes related to the actions of the coordinate recognition apparatus. In particular, as coordinates of the operation position (hereinafter, referred to as operation coordinates) on the display surface of the display 61 by the user are recognized, the CPU 3 outputs driving signals for the light-emitting elements Lx1 to Lxr and Ly1 to Lys to the selector 7.

The selector 7 selectively supplies the driving signals input from the CPU 3 to the light-emitting elements Lx1 to Lxr and Ly1 to Lys via a flexible cable 16 (see FIG. 2) connecting the detection device 1 and the controller 2. The light-emitting element to which the driving signal is supplied generates infrared rays.

When the light-sensing elements Px1 to Pxr and Py1 to Pys sense the infrared rays emitted by the light-emitting elements Lx1 to Lxr and Ly1 to Lys, detection signals corresponding to the intensities of the sensed infrared rays are output to the selector 8 via the flexible cable 16. The selector 8 selectively takes in the input detection signals and outputs the signals to the amplifier 9.

The amplifier 9 amplifies the input detection signal to a predetermined level to be output to the AD converter 10. The AD converter 10 converts the detection signal input from the amplifier 9 into a digital signal to be output to the CPU 3.

The CPU 3 calculates operation coordinates by the user using the digital detection signal input from the AD converter 10 and outputs the calculation result to the host computer 60 via the interface 6.

The host computer 60 executes various processes using the operation coordinates input from the controller 2. For example, the host computer 60 compares the operation coordinates to the coordinates of various GUI components displayed on the display 61, and when GUI components that can be operated at the operation coordinates are present, executes a process corresponding to the GUI components. As another example, on the basis of a time change in the operation coordinates, the host computer 60 enlarges or reduces an image displayed on the display 61, or causes the image to slide in the up, down, left, and right directions. Furthermore, as another example, the host computer 60 displays a line segment, a curve, or the like connecting the operation coordinates on the display 61.

The configuration of the detection device 1 will be described in detail. FIG. 2 is an exploded perspective view of the detection device 1 and an LCD panel 62 included in the display 61.

As shown in FIG. 2, the detection device 1 includes an outer frame 11, a printed wiring board 12, and a transparent acrylic plate 13. The outer frame 11 is formed of, for example, an ABS resin. The rectangular opening of the outer frame 11 corresponds to the area A shown in FIG. 1 where an operation by the user is detected. Under the outer frame 11, a cover 14 for covering the light-emitting elements Lx1 to Lxr and Ly1 to Lys and the light-sensing elements Px1 to Pxr and Py1 to Pys is provided along the edge of the opening. The cover 14 is formed of a black resin which transmits infrared rays and through which the light-emitting elements Lx1 to Lxr and Ly1 to Lys and the light-sensing elements Px1 to Pxr and Py1 to Pys are not seen from the inside of the opening.

The printed wiring board 12 has a rectangular frame shape having an opening with substantially the same size as the opening of the outer frame 11. In FIG. 2, on the long sides of the printed wiring board 12 denoted by the "X direction", the light-emitting elements Lx1 to Lxr and the light-sensing elements Px1 to Pxr are disposed to oppose each other at equal pitches. On the other hand, in FIG. 2, on the short sides of the printed wiring board 12 denoted by the "Y direction", the light-emitting elements Ly1 to Lys and the light-sensing element Py1 to Pys are arranged to oppose each other at equal pitches.

In this configuration, the light-emitting elements Lx1 to Lxr and Ly1 to Lys and the light-sensing elements Px1 to Pxr and Py1 to Pys are all included in the same plane. This plane is defined as an XY plane.

A connector 15 is provided in the printed wiring board 12, and one end of the flexible cable 16 is connected to the connector 15.

The acrylic plate 13 is a rectangular flat plate that is greater than the opening of the outer frame 11 or the printed wiring board 12 and has a smaller size than the outline of the outer frame 11.

In FIG. 2, areas 63 denoted by oblique lines on the LCD panel 62 represent images of the GUI components or the like displayed on the LCD panel 62.

Figure 3:
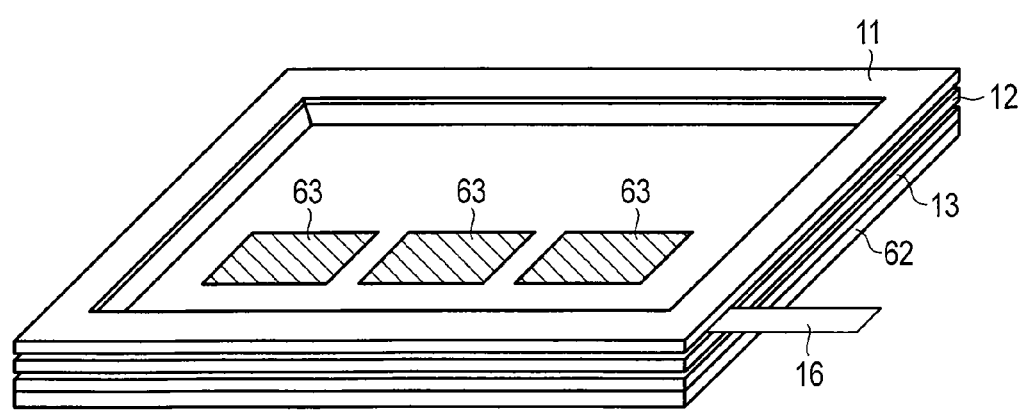
FIG. 3 is a perspective view showing a state where components shown in FIG. 2 are fixed.

A perspective view of a state where the outer frame 11, the printed wiring board 12, the acrylic plate 13, and the LCD panel 62 are overlapped in this order and fixed is shown in FIG. 3. The images displayed on the LCD panel 62 are visible from the outside via the acrylic plate 13. When the user touches the acrylic plate 13 with a finger, a touch pen, or the like to operate the screen of the LCD panel 62, a part of the light paths formed in the XY plane by the light-emitting elements Lx1 to Lxr and Ly1 to Lys and the light-sensing elements Px1 to Pxr and Py1 to Pys is blocked. Although described later in detail, the controller 2 recognizes the coordinates of the operation position in the XY plane on the basis of a combination of the light-emitting elements and the light-sensing elements corresponding to the blocked light paths.

In general, in regard to inputting of coordinates using the coordinate recognition apparatus, the smoothness of the inputs tends to be important when the user moves the operation position for the operation area A at a low speed, and the followability of the inputs tends to be important when the user moves the operation position at a high speed.

Focusing on this fact, in first to fourth embodiments described as follows, the degree of smoothing the inputs is dynamically changed according to the speed of movement of the operation position by the user.

Hereinafter, the first to fourth embodiments related to the actions of the coordinate recognition apparatus will be described with reference to the drawings.

First Embodiment

FIG. 4 is a block diagram showing the functions of the controller 2 according to the first embodiment.

The controller 2 realizes, as main functions, a first calculation section 21, a second calculation section 22, a detection section 23, a setting section 24, and a FIFO 25. Of these, the sections 21 to 24 are realized in software by the CPU 3 executing the computer programs stored in the ROM 4. The FIFO 25 is formed in the RAM 5.

The first calculation section 21 periodically calculates the coordinates of the operation position by the user on the basis of the detection result of the detection device 1. Hereinafter, the original coordinates are denoted by p(x, y).

The FIFO 25 is a first-in first-out queue and holds the original coordinates p sequentially calculated by the first calculation section 21. The FIFO 25 can hold the M original coordinates p at the maximum, and after holding the M original coordinates p, destroys the original coordinates p with the highest input order, thereby holding the original coordinates p newly calculated by the first calculation section 21 in an empty area. Hereinafter, the original coordinates held in the FIFO 25 are denoted by $p_0(x_0, y_0)$, $p_1(x_1, y_1)$, $p_2(x_2, y_2)$, ..., $p_{M-1}, (x_{M-1}, y_{M-1})$ in an order from the newly input one.

The second calculation section 22 calculates the smoothed coordinates by averaging a particular number m (m>0) of samples among the original coordinates p held in the FIFO 25 from the new one in the input order. Hereinafter, the smoothed coordinates are denoted by P(X, Y).

The detection section 23 detects the speed V of movement of the operation position of the user for the operation area A on the basis of the original coordinates p calculated by the first calculation section 21.

The setting section 24 sets the number m of samples. In particular, in this embodiment, the setting section 24 sets the number m of samples to be smaller as the speed V of movement detected by the detection section 23 is higher.

Next, details of the actions of the controller 2 will be described.

Figure 5:
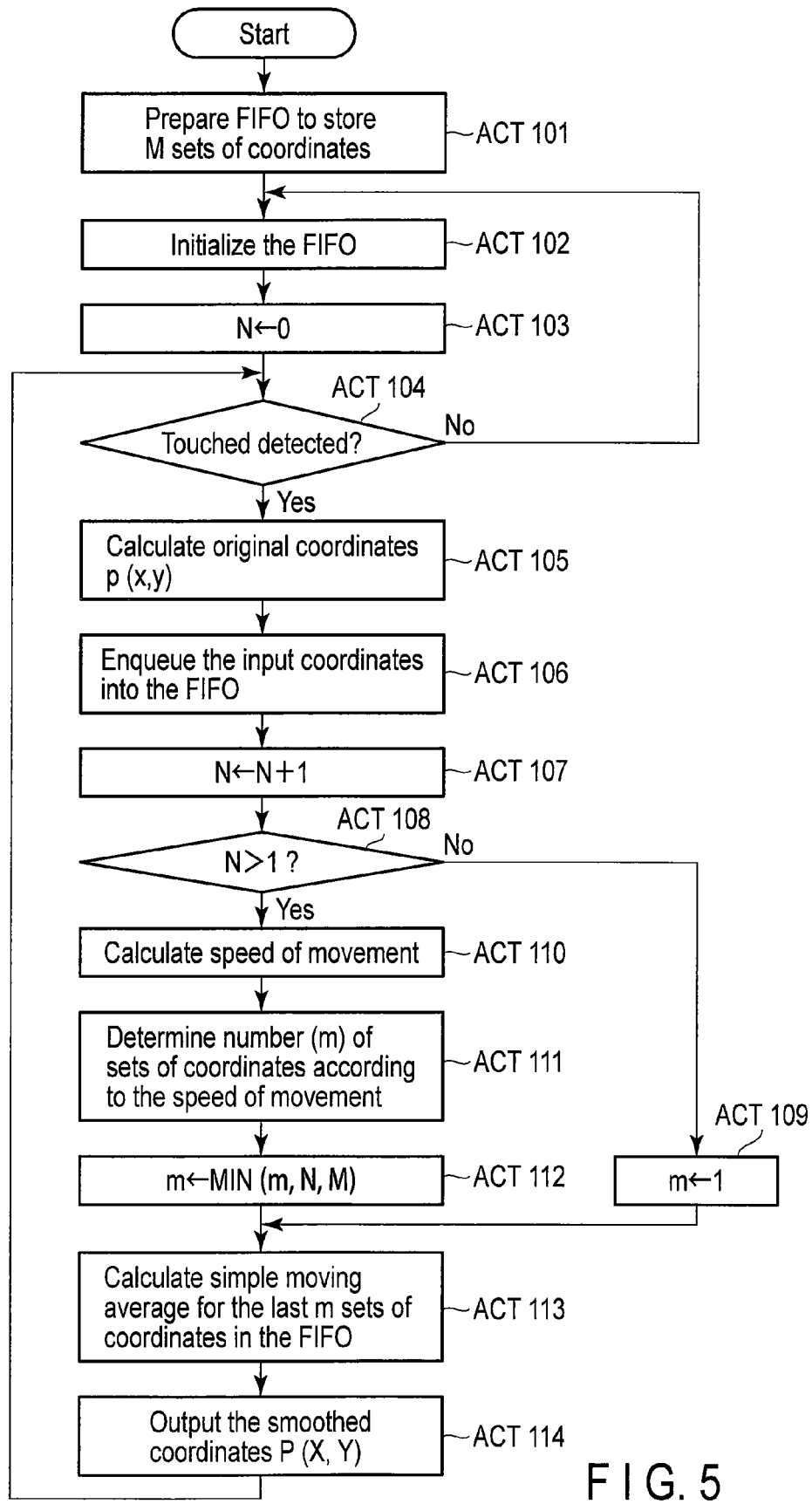
FIG. 5 is a flowchart showing the actions of the controller according to the first embodiment.

FIG. 5 is a flowchart showing the actions of the controller 2 according to this embodiment. The actions shown in the flowchart are started when, for example, the coordinate recognition apparatus is started up.

In addition, during start-up of the coordinate recognition apparatus, the controller 2 forms a counter N, a variable for storing the number m of samples, an array $sfgx(k_x)$, and an array $sfgy(k_y)$ in the RAM 5. The array $sfgx(k_x)$ is an array having the identification number $k_x$ of each pair as a parameter for holding the result of light blocking determination of the light path formed by each pair of the light-emitting elements Lx1 to Lxr and the light-sensing elements Px1 to Pxr lined up in the X direction. The array $sfgy(k_y)$ is an array having the identification number $k_y$ of each pair as a parameter for holding the result of light blocking determination of the light path formed by each pair of the light-emitting elements Ly1 to Lys and the light-sensing element Py1 to Pys lined up in the Y direction.

Moreover, the controller 2 generates the FIFO 25 in the RAM 5 (Act 101), initializes the FIFO 25 (Act 102), and initializes the value of the counter N to 0 (Act 103).

Next, the controller 2 shifts to a state where an operation for the operation area A is detected. That is, the controller 2 periodically performs an operation of forming the r+s light paths by selectively driving the light-emitting elements Lx1 to Lxr and Ly1 to Lys and the light-sensing elements Px1 to Pxr and Py1 to Pys. After forming the r+s light paths, the time interval until the next r+s light paths are formed is constant at tc (ms).

In this state, the controller 2 waits for an operation for the operation area A (Act 104). Here, for example, the controller 2 determines whether or not each light path is blocked by comparing an output voltage of each of the light-sensing elements Px1 to Pxr and Py1 to Pys during formation of each light path to a predetermined threshold, and if there is at least one light path that can be determined to be blocked, determines that the operation area A is operated by the user (Yes in Act 104). In addition, the controller 2 sets the $sfgx(k_x)$ related to the identification number $k_x$ of the pair determined not to be blocked from among the pairs formed by the light-emitting elements Lx1 to Lxr and the light-sensing elements Px1 to Pxr lined up in the X direction to 0 and sets the $sfgx(k_x)$ related to the identification number $k_x$ of the pair determined to be blocked to 1. In addition, the controller 2 sets the $sfgy(k_y)$ related to the identification number $k_y$ of the pair determined not to be blocked from among the pairs formed by the light-emitting elements Ly1 to Lys and the light-sensing elements Py1 to Pys lined up in the Y direction to 0 and sets the $sfgy(k_y)$ related to the identification number $k_y$ of the pair determined to be blocked to 1.

When it is determined that the operation area A is operated, the controller 2 calculates the original coordinates p(x, y) on the basis of the result of the determination of light blocking (Act 105). This process is executed by the first calculation section 21. As a method of calculating the original coordinates p(x, y), various methods may be employed. For example, the first calculation section 21 obtains the center point of a range of the identification number $k_x$ of the $sfgx(k_x)$ having a value of 1 to use the center point as a component x of the original coordinates p, and obtains the center point of a range of the identification number $k_y$ of the $sfgy(k_y)$ having a value of 1 to use the center point as a component y of the original coordinates p.

After Act 105, the controller 2 stores the calculated original coordinates p(x, y) in the FIFO 25 (Act 106). Moreover, the controller 2 subjects the value of the counter N to an increment of 1 (Act 107), and determines whether or not the value of the counter N is greater than 1 (N>1) (Act 108).

If the original coordinates p calculated in Act 105 are the first coordinates calculated after the operation for the operation area A is detected, the counter N=1 is satisfied. In this case (No in Act 108), since the FIFO 25 has only a single sample of the original coordinates p, the controller 2 sets the value of the variable m to 1 (Act 109).

On the other hand, if the counter N is greater than 1 (N>1, Yes in Act 108), that is, if the FIFO 25 holds a plurality of samples of the original coordinates p, the controller 2 detects the speed V of movement of the operation position of the user for the operation area A (Act 110). This process is executed by the detection section 23. In this embodiment, the detection section 23 calculates a distance d between the last original coordinates $p_0$ and the original coordinates $p_1$ held in the FIFO 25, and obtains the speed V by dividing the calculated distance d by the time interval tc described above (V=d/tc≥0).

After Act 110, the controller 2 determines the value of the number m of samples on the basis of the calculated speed V (Act 111). This process is executed by the setting section 24. In this embodiment, the setting section 24 determines the number m of samples by the following expression (1).

$$m = M(V_0/V) \quad (1)$$

where $V_0$ is a predetermined reference speed. The reference speed $V_0$ may be set to a small value when the followability of the smoothed coordinates P for the original coordinates p has priority and may be set to a great value when noise removal from the original coordinates p has priority. As in the expression (1), when the number m of samples has a value in reverse proportion to the speed V of movement, the number m of samples is reduced as the speed V of movement is higher. In addition, when the number m of samples calculated in the expression (1) is not an integer, the number m is rounded up to an integer from, for example, one decimal point. In addition, when the speed V of movement is 0, the number m of samples is set to M which is the maximum number of coordinates stored in the FIFO 25.

Moreover, the setting section 24 sets the final number m of samples to the minimum one of the number m of samples obtained in the expression (1), the counter N, and the maximum number M of coordinates stored in the FIFO 25 (Act 112).

After setting the number m of samples, the controller 2 calculates the smoothed coordinates P(X, Y) (Act 113). This process is executed by the second calculating section 22. In this embodiment, the second calculation section 22 obtains a moving average using the m original coordinates ($p_0$ to $p_{m-1}$) among the original coordinates stored in the FIFO 25 counted from the last one. The moving average is a simple moving average for obtaining the smoothed coordinates P(X,Y) using the average value of the components $x_0$ to $x_{m-1}$ of the m original coordinates $p_0$ to $p_{m-1}$ as X and using the average value of the components $y_0$ to $y_{m-1}$ of the m original coordinates $p_0$ to $p_{m-1}$ as Y.

In addition, if the counter N=1 is satisfied in Act 108 (No in Act 108), the controller 2 sets the number m of samples to 1 through Act 109 and the actions proceed to Act 113. In this case, the smoothed coordinates P(X, Y) calculated in Act 113 are equal to the original coordinates p(x, y) calculated in Act 105.

After calculating the smoothed coordinates P as such, the controller 2 outputs the corresponding smoothed coordinates P to the host computer 60. The host computer 60 performs various processes using the smoothed coordinates P input from the coordinate recognition apparatus.

After Act 114, if the user continuously comes into contact with the operation area A with the finger or the stylus (Yes in Act 104), the controller 2 performs the actions after Act 105 again. If the user detaches the finger or the stylus from the operation area A (No in Act 104), the controller 2 initializes the FIFO 25 and the counter N (Acts 102 and 103) and waits for the next operation for the operation area A.

As described above, the controller 2 in this embodiment smoothes the original coordinates p stored in the FIFO 25 while setting the number m of samples to be smaller as the speed V of movement of the operation position of the user for the operation area A is higher, thereby calculating the smoothed coordinates P. When the number m of samples is changed as such, during low-speed movement of the operation position, the smoothed coordinates P are calculated using many original coordinates p, so that smooth coordinate inputting can be achieved while suppressing variations. On the other hand, during high-speed movement of the operation position, the smoothed coordinates P are calculated using a small number of original coordinates p, so that good followability of the input coordinates for the actual operation position can be maintained.

Second Embodiment

The second embodiment will be described.

In this embodiment, smoothed coordinates P are obtained from a weighted moving average of the original coordinates P held in the FIFO 25, and moreover, weight values allocated to the respective original coordinates p are dynamically changed according to the speed V of movement of the operation position.

Like elements which are the same as those of the first embodiment are denoted by like reference numerals, and overlapping description will be provided only if needed.

Figure 6:
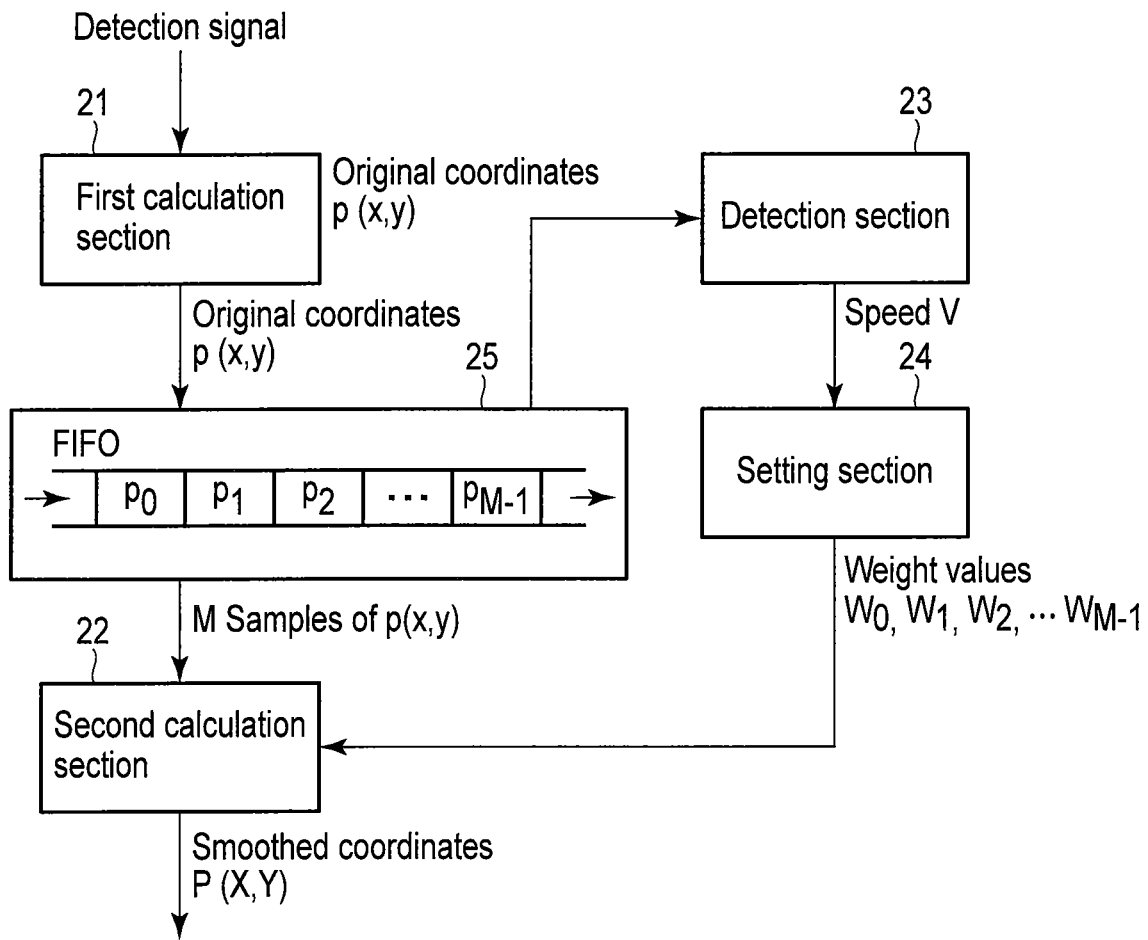
FIG. 6 is a block diagram showing the functions of a controller according to a second embodiment.

FIG. 6 is a block diagram showing the functions of the controller 2 according to the second embodiment.

The controller 2 realizes, as in the first embodiment, the first calculation section 21, the second calculation section 22, the detection section 23, the setting section 24, and the FIFO 25.

Here, the second calculation section 22 in this embodiment multiplies the M original coordinates $p_0, p_1, p_2, \ldots p_{M-1}$ held in the FIFO 25 by the respective weight values $W_0, W_1, W_2, \ldots, W_{M-1}$ to be averaged, thereby calculating smoothed coordinates P(X, Y).

In addition, the setting section 24 in this embodiment sets the weight values $W_0, W_1, W_2, \ldots, W_{M-1}$ so that the weight value for the new coordinates in the calculation order becomes relatively high as the speed V of movement is high and the weight values approximate the equal state as the speed V of movement is low.

Next, details of the actions of the controller 2 will be described.

Figure 7:
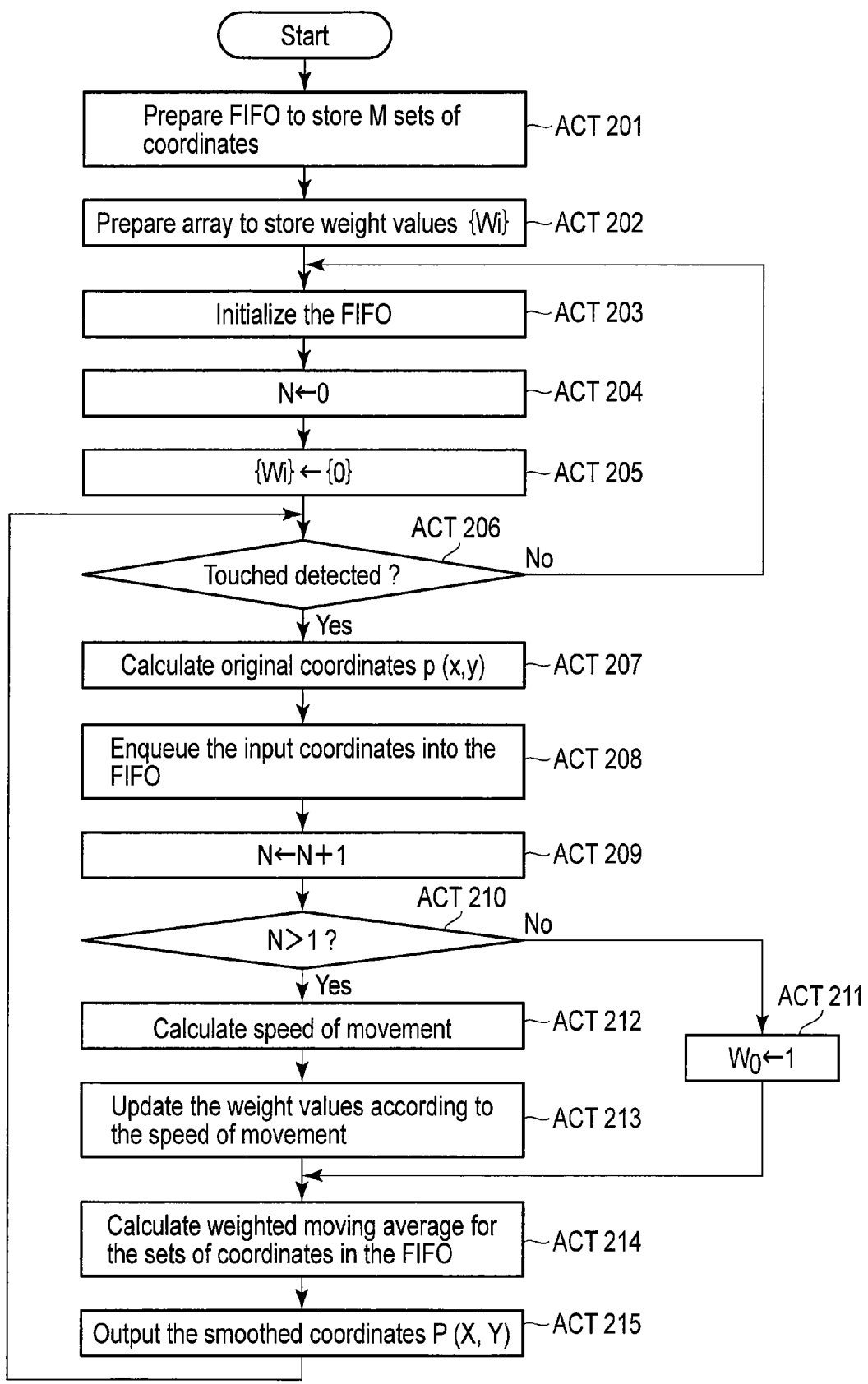
FIG. 7 is a flowchart showing the actions of the controller according to the second embodiment.

FIG. 7 is a flowchart showing the actions of the controller 2 according to this embodiment. The actions shown in the flowchart are started when, for example, the coordinate recognition apparatus is started up.

During start-up of the coordinate recognition apparatus, the controller 2 forms, as in the first embodiment, a counter N, an array sfgx($k_x$), and an array sfgy($k_y$) in the RAM 5.

Moreover, the controller 2 generates the FIFO 25 in the RAM 5 (Act 201), and forms an array {$W_i$} for holding the weight values $W_0, W_1, W_2, \ldots, W_{M-1}$ in the RAM 5 (Act 202). In addition, the controller 2 initializes the FIFO 25 (Act 203), initializes the value of the counter N to 0 (Act 204), and initializes the values of the array {$W_i$} to 0 (Act 205).

Next, the controller 2 shifts to a state where an operation for the operation area A is detected, and waits for an operation for the operation area A while periodically performing an action of forming the r+s light paths (Act 206). Here, for example, the controller 2 determines whether or not each light path is blocked by comparing an output voltage of each of the light-sensing elements Px1 to Pxr and Py1 to Pys during formation of each light path to a predetermined threshold, and if there is at least one light path that can be determined to be blocked, determines that the operation area A is operated by the user (Yes in Act 206). In addition, the controller 2 sets the sfgx($k_x$) and sfgy($k_y$) to 0 or 1 according to the blocked state of each light path as in the first embodiment.

When it is determined that the operation area A is operated, the first calculation section 21 calculates the original coordinates p(x, y) on the basis of sfgx($k_x$) and sfgy($k_y$) which are the results of the determination of the light blocking, as in the first embodiment (Act 207).

After Act 207, the controller 2 stores the calculated original coordinates p(x, y) in the FIFO 25 (Act 208), subjects the value of the counter N to an increment of 1 (Act 209), and determines whether or not the value of the counter N is greater than 1 (N>1) (Act 210).

If the counter N=1 (No in Act 210), only a single sample of the original coordinates P is held in the FIFO 25. In this case, the controller 2 sets the weight value $W_0$ of the array $\{W_i\}$ to 1 (Act 211).

On the other hand, if the counter N is greater than 1 (N>1, Yes in Act 210), that is, if the FIFO 25 holds a plurality of samples of the original coordinates p, the detection section 23 detects the speed V of movement of the operation position of the user for the operation area A by the same method as in the first embodiment (Act 212).

After Act 212, the setting section 24 sets each of the weight values $W_0, W_1, W_2, \ldots, W_{M-1}$ of the array $\{W_i\}$ on the basis of the speed V (Act 213). Each of the weight values $W_0, W_1, W_2, \ldots, W_{M-1}$ is determined by, for example, the following expression (2) using a tolerance D.

$$W_i = 1 - i \times D \; [i = 0 \text{ to } M-1] \qquad (2)$$

Here, if $W_i < 0$, $W_i = 0$.

The tolerance D is determined by, for example, the following expression (3) using the reference speed $V_0$.

$$D = V/V_0 \qquad (3)$$

As in the expression (3), when the tolerance D has a value in proportion to the speed V of movement, the weight values $W_0, W_1, W_2, \ldots, W_{M-1}$ are set so that the weight value $W_0$ becomes relatively high as the speed V of movement is higher, and the weight values $W_0, W_1, W_2, \ldots, W_{M-1}$ approximate the equal state as the speed V of movement is low.

After setting the weight values $W_0, W_1, W_2, \ldots, W_{M-1}$, the second calculation section 22 calculates the smoothed coordinates P(X, Y) (Act 214). The second calculation section 22 obtains the smoothed coordinates P(X, Y) by calculating weighted moving averages as in the following expressions (4) and (5), using the original coordinates $p_0(x_0, y_0)$ to $p_{M-1}(x_{M-1}, y_{M-1})$ held in the FIFO 25 and the weight values $W_0, W_1, W_2, \ldots, W_{M-1}$ of the array $\{W_i\}$.

$$X = (W_0 x_0 + W_1 x_1 \ldots + W_{M-1} x_{M-1})/(W_0 + W_1 \ldots + W_{M-1}) \qquad (4)$$

$$Y = (W_0 y_0 + W_1 y_1 \ldots + W_{M-1} y_{M-1})/(W_0 + W_1 \ldots + W_{M-1}) \qquad (5)$$

In addition, if the number of original coordinates held in the FIFO 25 (that is, the value of the counter N) does not satisfy M (N<M), the value of $W_i$ using i that satisfies, for example, in as an index may be set to 0.

In addition, if the counter N=1 in Act 210 (No in Act 210), the controller 2 sets the weight value $W_0$ to 1 through Act 211 and proceeds to Act 214. In this case, the smoothed coordinates P(X, Y) calculated in Act 214 are equal to the original coordinates p(x, y) calculated in Act 207.

After calculating the smoothed coordinates P as such, the controller 2 outputs the corresponding smoothed coordinates P to the host computer 60. The host computer 60 performs various processes using the smoothed coordinates P input from the coordinate recognition apparatus.

After Act 215, if the user continuously comes into contact with the operation area A with the finger or the stylus (Yes in Act 206), the controller 2 performs the actions after Act 207 again. If the user detaches the finger or the stylus from the operation area A (No in Act 206), the controller 2 initializes the FIFO 25, the counter N, and the array $\{W_i\}$ (Acts 203, 204, and 205) and waits for the next operation for the operation area A.

As described above, in this embodiment, the weight values $W_i$ for the respective coordinates held in the FIFO 25 are set so that the weight value $W_i$ for the new original coordinates $p_i$ in the calculation order held in the FIFO 25 becomes relatively high as the speed V of movement of the operation position of the user for the operation area A is high and the weight values $W_i$ approximate the equal state as the speed V of movement is low. When the weight values $W_i$ are changed as such, during low-speed movement of the operation position, the smoothed coordinates P are calculated so as to be equally influenced by the original coordinates $p_0$ to $p_{M-1}$ held in the FIFO 25, so that smooth coordinate inputting can be achieved while suppressing variations. On the other hand, during high-speed movement of the operation position, the smoothed coordinates P are calculated so that the influence of the new original coordinates in the calculation order from among the original coordinates $p_0$ to $p_{M-1}$ held in the FIFO 25 is higher than those of the old original coordinates, thereby maintaining good followability of the input coordinates for the actual operation position.

Third Embodiment

The third embodiment will be described.

When the smoothed coordinates P are calculated as in the first and second embodiments, when the speed of the operation position by the user is rapidly reduced, there is a phenomenon in which the smoothed coordinates P significantly deviate from the actual operation position.

This phenomenon will be described using a specific example.

Here, the number of samples for the moving average is 4 in use at the maximum (M=4), and the number m of samples for the moving average is changed from 1 to 4 according to the speed V of movement of the operation position. In addition, for simplifying the description, only the X direction is considered.

Figure 8:
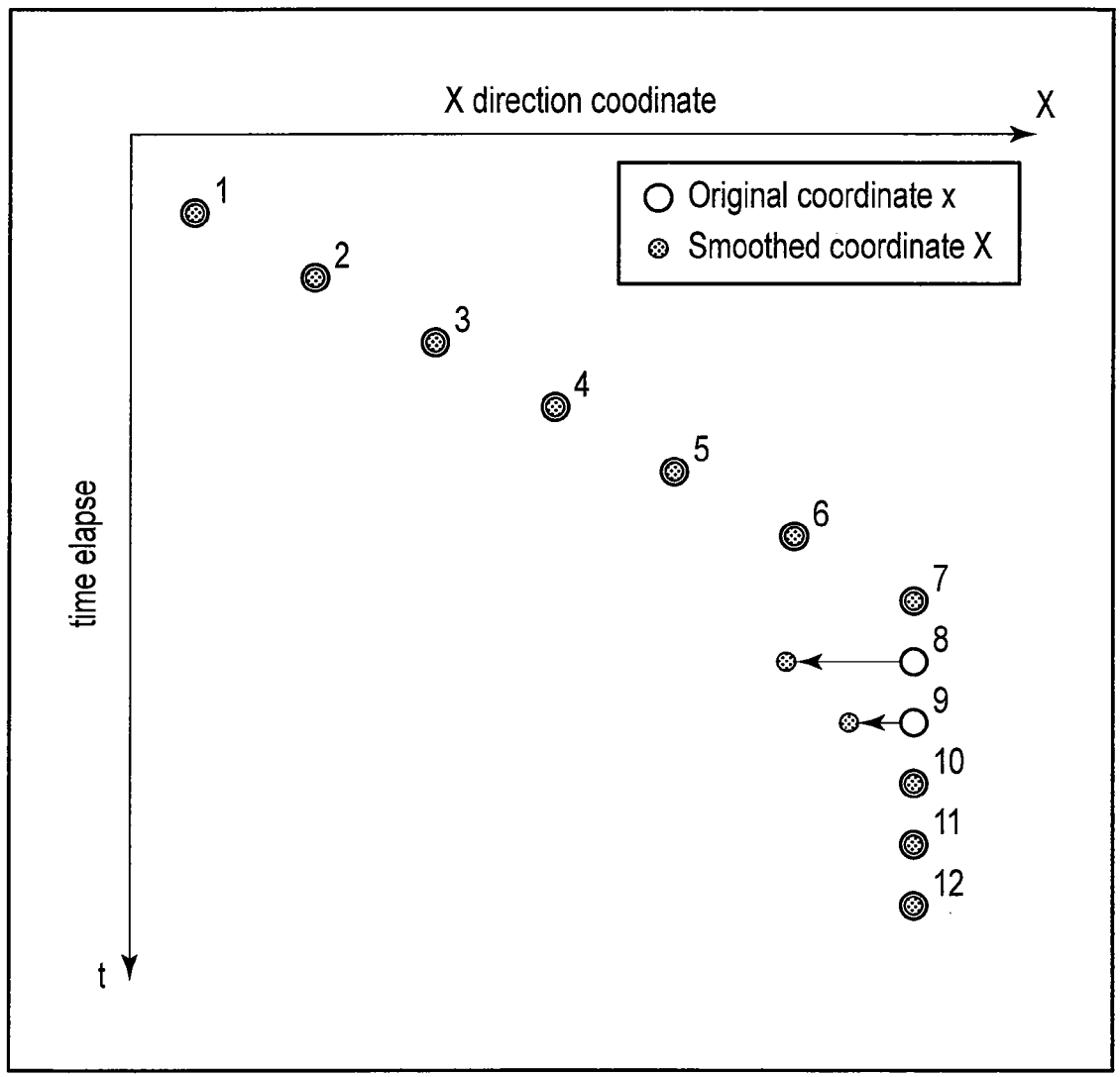
FIG. 8 is a diagram showing a relationship between original coordinates and smoothed coordinates when an operation position that has been moved at a constant speed is suddenly stopped in the first and second embodiments.

When the operation position that is moved at a constant speed is suddenly stopped, a relationship between the original coordinates x (or the actual operation position), the smoothed coordinates X, and time t is as shown in FIG. 8. The original coordinates x denoted by 1 to 7 are moved at a high speed, and the number of samples for the moving average is 1 (m=1), that is, smoothing is not substantially performed. Since the original coordinates denoted by 8 to 12 are stopped, the number m of samples calculated from the expression (1) is maximized. In addition, since the counter N is 8 to 12, the number m of samples determined in Act 112 becomes the value of M, that is, 4 (m=M). Then, the smoothed coordinates X calculated for the original coordinates x denoted by 8 and 9 are significantly turned back in the reverse direction to the movement direction of the original coordinates x denoted by 1 to 7, by the influence of the original coordinates x denoted by 5 and 6. This phenomenon also occurs during calculation of the smoothed coordinates Y. In addition, this phenomenon also occurs when the smoothed coordinates P are calculated in the technique of the second embodiment.

In the third embodiment, in order to be compatible with this phenomenon, the technique of calculating the smoothed coordinates P in the first embodiment is modified.

In the following description, like elements that are the same as those of the first embodiment are denoted by like reference numerals, and overlapping description will be provided only if needed.

The controller 2 in this embodiment realizes the functions shown in FIG. 4 as in the first embodiment and performs actions according to the flowchart of FIG. 5.

However, in Act 111, the controller 2 (the setting section 24) sets the number m of samples using the following expression (6) instead of the expression (1).

$$m = \alpha M(V_0/V) \qquad (6)$$

where $\alpha$ is a correction coefficient, and is calculated by, for example, the following expression (7) using an average value $V_{avg}$ of the last speed V of movement of the operation position.

$$\alpha = (V/V_{avg})^2 \qquad (7)$$

The average speed $V_{avg}$ is obtained by, for example, averaging speeds obtained by dividing the distances between the original coordinates p held in the FIFO 25 (the distances between $p_0$ and $p_1$, between $p_1$ and $p_2$, between $p_2$ and $p_3$, ..., between $p_{M-2}$ and $p_{M-1}$) by the time interval tc. When the average speed $V_{avg}$ is calculated, a weighted average may be used. When the weighted average is used, for example, a weight value obtained by multiplying a speed calculated on the basis of the distance between the original coordinates $p_0$ and the original coordinates $p_1$ may be set to be greater than a weight value obtained by multiplying another speed.

Here, if the correction coefficient $\alpha$ calculated by the expression (7) is greater than 1 ($\alpha > 1$), the value of the correction coefficient $\alpha$ is set to 1, and the number m of samples is calculated by the expression (6).

Typically, as an amount of reduction in the speed of movement of the operation position is greater, the current speed V of movement becomes smaller than the recent average speed $V_{avg}$. That is, by the expressions (6) and (7), during a reduction in the speed V of movement, as the amount of the reduction is higher, the number m of samples is set to be smaller.

As such, the controller 2 according to this embodiment sets the number m of samples to be small as the amount of reduction is greater during a reduction in the speed V of movement. In this manner, during a rapid reduction in the speed of the operation position by the user, the number m of samples is reduced and thus followability is increased. Therefore, the generation of the phenomenon described using FIG. 8 is prevented or reduced.

Fourth Embodiment

The fourth embodiment will be described.

In the fourth embodiment, in order to be compatible with the phenomenon described using FIG. 8, the technique of calculating the smoothed coordinates P in the second embodiment is modified.

Like elements that are the same as those of the second embodiment are denoted by like reference numerals, and overlapping description will be provided only if needed.

The controller 2 in this embodiment realizes the functions shown in FIG. 6 as in the second embodiment and performs actions according to the flowchart of FIG. 7. However, the detection section 23 according to this embodiment calculates, other than the speed V of movement, the distances $d_i$ (i=1 to M−1) between $p_0$ and $p_1$, between $p_1$ and $p_2$, between $p_2$ and $p_3$, ..., between $P_{M-2}$ and $p_{M-1}$ which are the original coordinates held in the FIFO 25.

In addition, in Act 213, the controller 2 (the setting section 24) sets the weight values $W_0, W_1, W_2, \ldots, W_{M-1}$ in the following order.

That is, first, the setting section 24 calculates an average value $d_{avg}$ of the distances $d_i$. The average value $d_{avg}$ may be obtained by adding the distances $d_i$ where i=1 to M−1 and dividing the sum by M−1 or may use a weighted average. When the weighted average is used, for example, the following expression (8) is used. Here, the expression (8) exemplifies the case where M=4.

$$d_{avg} = (2 \cdot d_1 + d_2 + d_3)/4 \qquad (8)$$

When the average value $d_{avg}$ obtained as described above is equal to or greater than a predetermined threshold $d_{th}$ ($d_{avg} \geq d_{th}$), the setting section 24 sets the tolerance D=1. In addition, the threshold $d_{th}$ may be set to a small value when followability of the smoothed coordinates P for the original coordinates P has priority and may be set to a great value when noise removal from the original coordinates p has priority.

On the other hand, when the average value $d_{avg}$ is smaller than the threshold $d_{th}$ ($d_{avg} < d_{th}$), the setting section 24 determines the tolerance D by the following expression (9).

$$D = d_{avg}/d_{th} \qquad (9)$$

In addition, the setting section 24 sets the weight values $W_0, W_1, W_2, \ldots, W_{M-1}$ by the following expression (10).

$$W_i = \alpha_i(1 - i \times D) \; [i=0 \text{ to } M-1] \qquad (10)$$

where $\alpha_i$ is a correction coefficient and is calculated by, for example, the following expression (11).

$$\alpha_i = (d_{avg}/d_i)^2 \qquad (11)$$

Here, if $d_i < d_{avg}$, $\alpha_i = 1$ is set.

In addition, when $W_i$ calculated by the expression (10) becomes negative ($W_i < 0$), $W_i = 0$ is set.

In the order described above, during a rapid reduction in the speed V of movement of the operation position, as the reduction amount is greater, the value of the average value $d_{avg}$ is reduced, so that the value of the coefficient $\alpha_i$ for the original coordinates $p_i$ calculated during high-speed movement is reduced. As a result, the weight value $W_i$ for the same original coordinates $p_i$ is reduced. On the other hand, during a rapid reduction in the speed V of movement, in many cases, $d_0 < d_{avg}$ is satisfied. Therefore, the value of the coefficient $\alpha_0$ for the last original coordinates $p_0$ becomes 1, and thus the weight value $W_0$ is set to 1 which is the maximum value. Therefore, the weight value $W_0$ for the original coordinates $p_0$ is set to be higher than the other weight values $W_i$.

As such, the controller 2 according to this embodiment sets the weight values $W_0$ to $W_{M-1}$ so that the weight value $W_0$ for the last original coordinates $p_0$ in the calculation order becomes relatively higher than the other weight values as the reduction amount is greater during a reduction in the speed V of movement. In this manner, followability is enhanced during a rapid reduction in the speed of the operation position by the user, so that the generation of the phenomenon described using FIG. 8 is prevented or reduced.

Modifications

In the first to third embodiments, the case where the number m of samples or the tolerance D is calculated using the speed V of movement is exemplified. However, the number m of samples or the tolerance D may be calculated on the basis of the distance d between the original coordinates $P_0$ and $P_1$ instead of the speed V of movement. In this case, the speed V of movement in the expressions (1), (3), (6), and (7) may be changed to the distance d, and the reference speed $V_0$ may be changed to the predetermined reference distance $d_0$. In addition, the average speed $V_{avg}$ in the expression (7) may be changed to the average value $d_{avg}$ of the distances $d_i$ between the original coordinates held in the FIFO 25. Even in this case, in consideration that the distance d and the speed V of movement are proportional to each other under the condition in which the period at which the original coordinates are calculated is substantially constant, the number m of samples or the weight values $W_i$ are still determined according to the speed V of movement.

In addition, the actions shown in the flowcharts of FIGS. 5 and 7 may be appropriately changed in the execution order.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A coordinate recognition apparatus comprising:
a detection device that detects an operation performed by a user in an operation area;
a first calculation section that calculates coordinates of a position of the operation performed by the user while the user continuously maintains contact with the operation area, on the basis of the detection result of the detection device;
a second calculation section that calculates smoothed coordinates by smoothing a particular number m (m>0) of newest coordinates calculated by the first calculation section;
a detection section that detects a speed of movement of the operation position of the user in the operation area on the basis of the coordinates calculated by the first calculation section;
a setting section that updates a value of the number m such that the value of the number m of coordinates to smooth becomes smaller as the speed detected by the detection section becomes higher and the value of the number m of coordinates to smooth becomes larger as the speed becomes lower while the user continuously maintains contact with the operation area; and
a controller via which the detection device, the first calculation section, the second calculation section, the detection section, and the setting section perform their respective operations.

2. The apparatus of claim 1, wherein the detection device is an optical detection device which includes a plurality of light-emitting elements, a plurality of light-sensing elements that are arranged to oppose the respective light-emitting elements and output detection signals corresponding to intensities of sensed light, and detects the operation of the user for the operation area between each of the light-emitting elements and each of the light-sensing elements.

3. The apparatus of claim 1, further comprising a memory that stores a predetermined number M (M>0) of the coordinates calculated by the first calculation section, wherein the setting section sets the number m to a calculation result of $M(V_0/V)$ assuming that a reference speed movement is $V_0$ and the speed of movement of the position of the operation performed by the user for the operation area is V.

4. The apparatus of claim 1, wherein the setting section sets the number m to have a value in proportion to $\alpha/V$ when it is assumed that the speed of movement is V and a coefficient $\alpha$ is defined to have a value which is reduced as an amount of reduction in the speed of movement is greater.

5. The apparatus of claim 4, further comprising a memory that stores a predetermined number M (M>0) of the coordinates calculated by the first calculation section, wherein the setting section sets the number m to a calculation result of $\alpha M(V_0/V)$ assuming that a reference speed of movement is $V_0$.

6. The apparatus of claim 5, wherein the value of the coefficient $\alpha$ becomes smaller as the speed V of movement becomes smaller than an average speed $V_{avg}$ of movement calculated using the M coordinates stored in the memory.

7. A coordinate recognition apparatus comprising:
a detection device that detects an operation performed by a user in an operation area;
a first calculation section that calculates coordinates of a position of the operation performed by the user while the user continuously maintains contact with the operation area, on the basis of the detection result of the detection device;
a second calculation section that multiplies each of a number of coordinates calculated by the first calculation section, by a particular weight value, and averages the coordinates obtained by multiplying the weight values, thereby calculating smoothed coordinates;
a detection section that detects a speed of movement of the operation position of the user in the operation area on the basis of the coordinates calculated by the first calculation section;
a setting section that updates the number of coordinates used to calculate the smoothed coordinates to be smaller as the speed detected by the detection section becomes higher and to be larger as the speed becomes lower while the user continuously maintains contact with the operation area; and
a controller via which the detection device, the first calculation section, the second calculation section, the detection section, and the setting section perform their respective operations.

8. The apparatus of claim 7, wherein the detection device is an optical detection device which includes a plurality of light-emitting elements, a plurality of light-sensing elements that are arranged to oppose the respective light-emitting elements and output detection signals corresponding to intensities of sensed light, and detects the operation of the user for the operation area between each of the light-emitting elements and each of the light-sensing elements.

9. The apparatus of claim 7, wherein the setting section sets the weight values to be reduced by a particular tolerance D.

10. The apparatus of claim 9, wherein the setting section determines the tolerance D so as to have a value in proportion to the speed of movement.

11. The apparatus of claim 7, wherein the setting section sets the weight values so that during a reduction in the speed of movement, the set weight values for newest coordinates are adjusted higher as an amount of the reduction in the speed of movement is greater.

12. A coordinate recognition method comprising:
detecting an operation performed by a user in an operation area, by a detection device;
calculating, via a controller, coordinates of the operation performed by the user and coordinates of additional positions of the operation as the user moves the position of the operation while the user continuously maintains contact with the operation area, on the basis of the detection result of the detection device;
multiplying, via the controller, each of a number of the calculated coordinates by a particular weight value, and averaging the coordinates, thereby calculating smoothed coordinates;

detecting a speed of movement of the operation position of the user in the operation area on the basis of the calculated coordinates of the operation; and updating, via the controller, the number of the coordinates used to calculate the smoothed coordinates to be smaller as the detected speed becomes higher and to be larger as the detected speed becomes lower while the user continuously maintains contact with the operation area.

13. The method of claim 12, wherein, as the detection device, an optical detection device is used which includes a plurality of light-emitting elements, a plurality of light-sensing elements that are arranged to oppose the respective light-emitting elements and output detection signals corresponding to intensities of sensed light, and detects the operation of the user for the operation area between each of the light-emitting elements and each of the light-sensing elements.

14. The method of claim 12, wherein the speed of movement is calculated on the basis of the calculated coordinates.

15. The method of claim 12, wherein the weight value is set to be reduced by a particular tolerance D that is in proportion to the speed of movement.

16. The method of claim 12, wherein, during a reduction in the speed of movement, the set weight value for newest coordinates are adjusted to be relatively higher as an amount of the reduction in the speed of movement is greater.

* * * * *